March 1, 1960     H. VERMETTE     2,926,922
CHUCK CONSTRUCTION
Filed Feb. 14, 1958     3 Sheets-Sheet 2
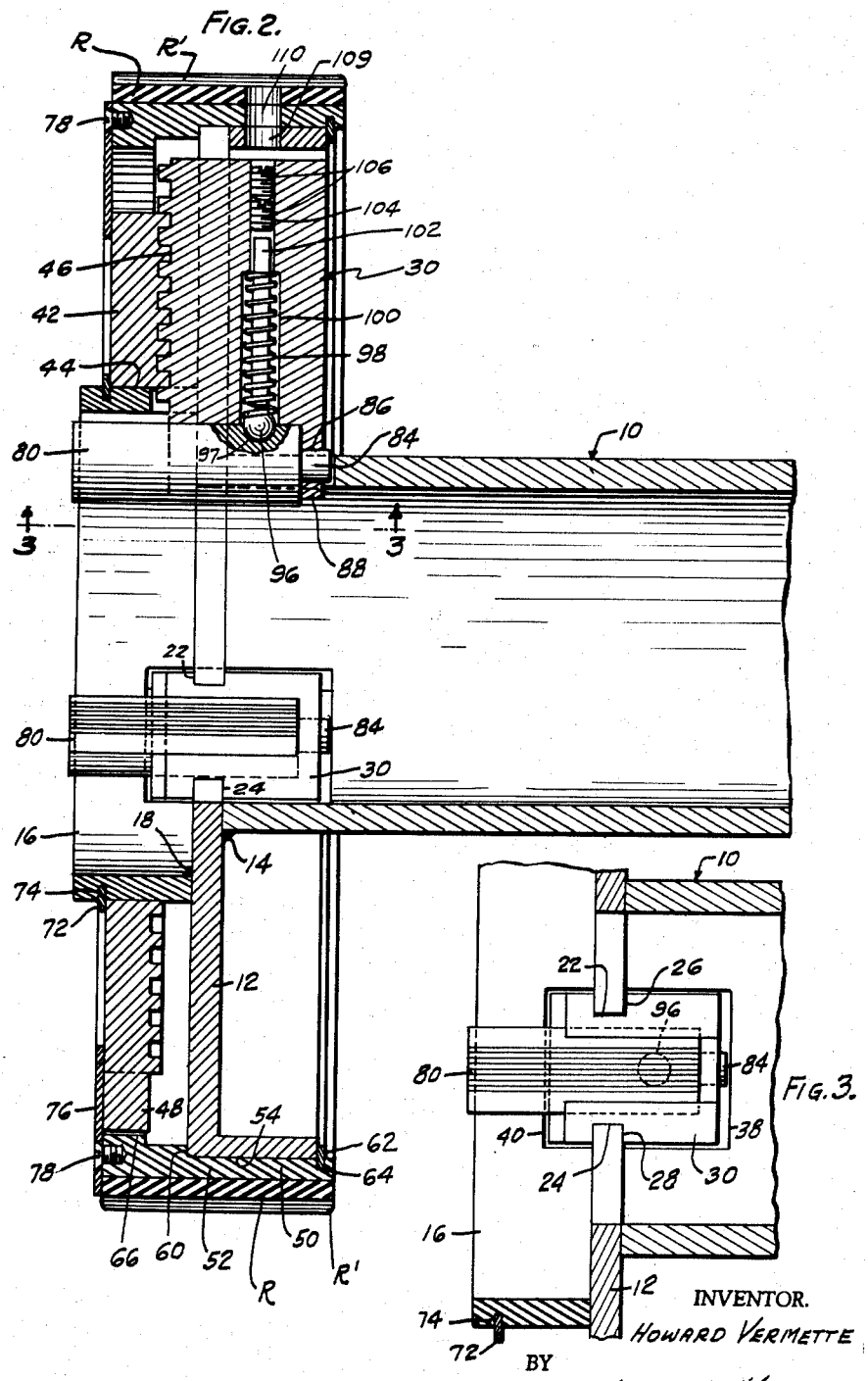
INVENTOR.
HOWARD VERMETTE
BY
Harry H. Hitzeman
ATTORNEY March 1, 1960

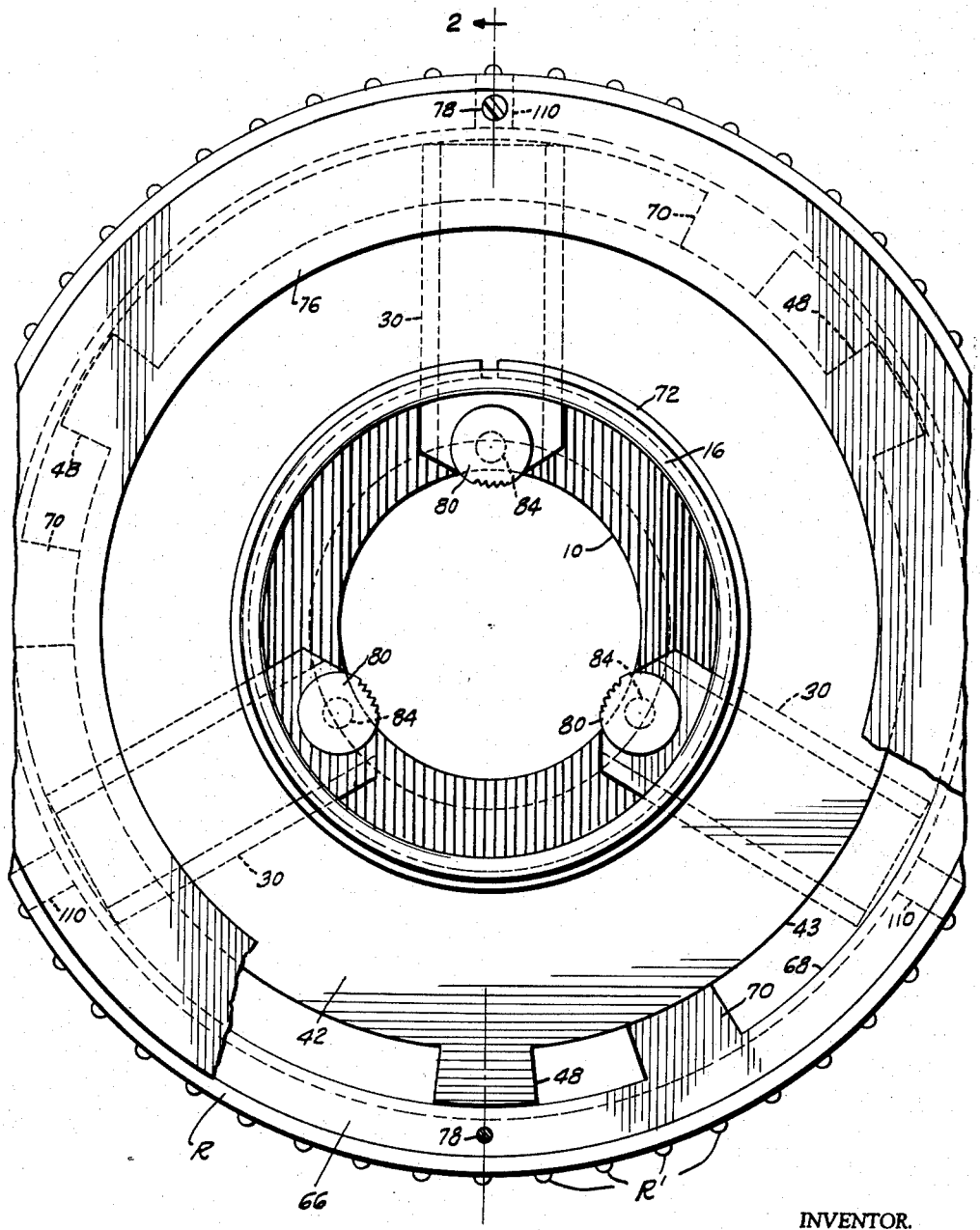

H. VERMETTE 2,926,922

CHUCK CONSTRUCTION

Filed Feb. 14, 1958

INVENTOR
HOWARD VERMETTE
By Harry H. Hitzman
ATTORNEY

United States Patent Office 2,926,922
Patented Mar. 1, 1960

2,926,922
CHUCK CONSTRUCTION
Howard Vermette, Hammond, Ind.
Application February 14, 1958, Serial No. 715,469
12 Claims. (Cl. 279—114)

My invention relates to improvements in scroll type chucks and similar devices.

My invention relates more particularly to scroll type chucks provided with self-tightening gripping members or jaws.

The principal object of the present invention is to provide an improved type of scroll chuck that is easily and cheaply made and provided with an improved type of jaw carrier and work holding jaws.

A further object of the invention is to provide in a chuck of the type described an improved jaw carrier and work holding jaw construction, said work holding jaw comparatively simple in construction and associated with said jaw carrier in such manner that it can not inadvertently be removed or knocked out of place.

A further object of the invention is to provide a chuck jaw or jaw carrier provided with a self-tightening insert, one so arranged in connection with the jaw carrier that it provides for a balanced load on the carrier, thereby minimizing the wear on the jaw itself and preventing the springing of the chuck body as the jaw insert applies its gripping action to a work piece.

Another object of the invention is to provide an improved construction of jaw carrier and jaw insert so arranged that pressure on the jaw insert will be evenly balanced between the two ends of the same so that a gripping action is obtained over the full length of the jaw inserts.

Another object of the invention is to provide an improved jaw carrier and insert or jaw so assembled that the jaw inserts may be easily removed and replaced if desired, yet when assembled and held in position are capable of long and hard usage without becoming broken or out of order.

Other objects and advantages will be more apparent from the following description wherein reference is had to the accompanying drawings, upon which Fig. 1 is a front elevational view of an improved type of scroll chuck provided with my improved work-holding jaws or jaw inserts;

Fig. 2 is a vertical sectional view through the scroll chuck taken generally on the line 2—2 of Fig. 1;

Fig. 3 is a fragmentary sectional view showing one of the jaw carriers and jaw inserts in the scroll chuck and is taken generally on the line 3—3 of Fig. 2 looking in the direction of the arrows;

Figure 4:
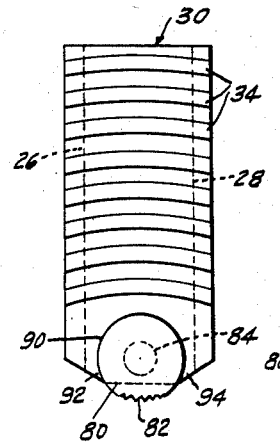
Fig. 4 is a front elevational view of the jaw carrier and jaw or jaw insert.
Figure 5:
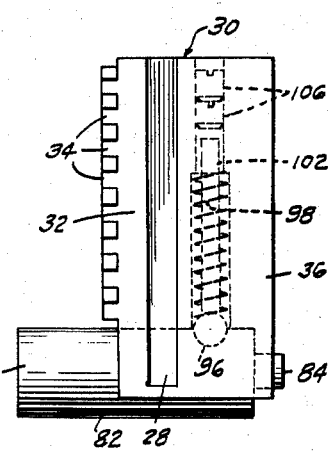
Fig. 5 is a side elevational view thereof.
Figure 6:
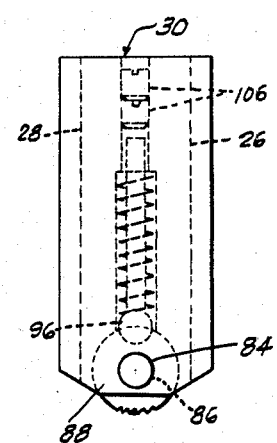
Fig. 6 is a back view of the same.
Figure 7:
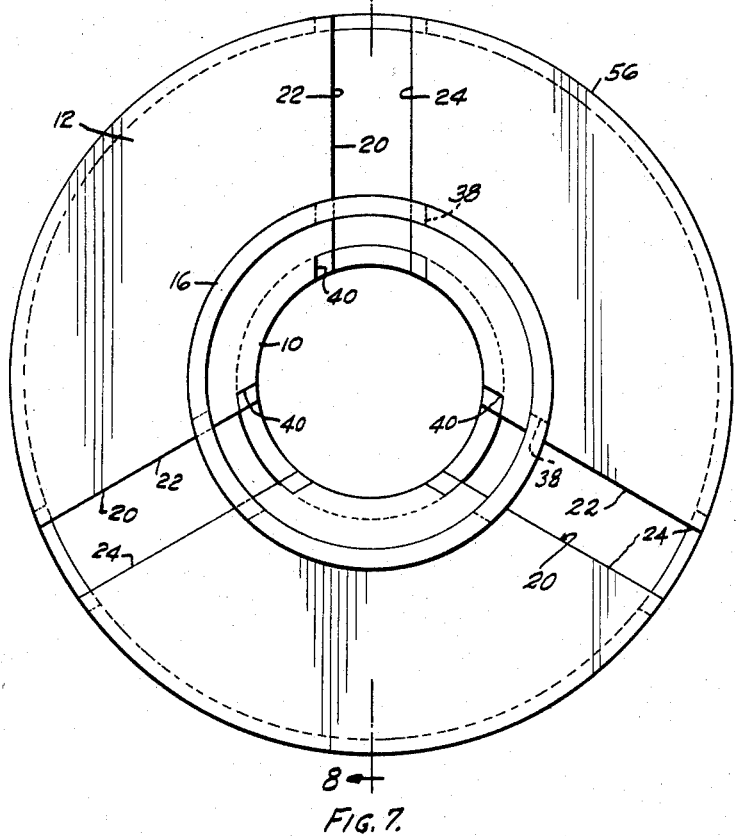
Fig. 7 is a front elevational view of the chuck body which I employ.
Figure 8:
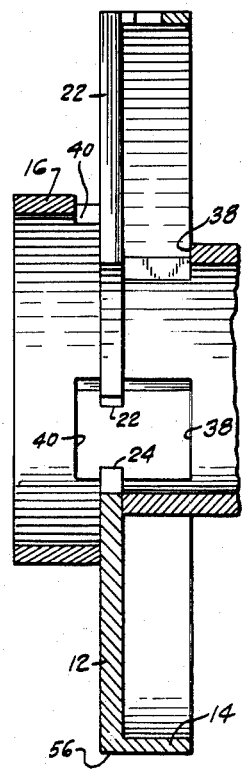
Fig. 8 is a cross-sectional view thereof taken on the line 8—8 of Fig. 7.

In the embodiment of the invention which I have chosen to illustrate and describe the same, I have shown a scroll chuck assembly which may include a hollow drive spindle 10 which may have a vertically disposed plate member 12 preferably welded thereto at 14, the plate 12 being generally disc-shaped as shown and having a backwardly turned lateral flange 14. The hollow drive spindle 10, plate member 12 and concentric ring 16 fastened to the forward side of the plate 12 by suitable welding at 18, may combine to form a chuck body as will hereinafter be more apparent.

The plate 12 is provided with a plurality of radial slots 20 extending from the edge of the same to a point adjacent the drive spindle 10, each of the slots 20 having opposed edges 22 and 24 which engage in parallel slots 26 and 28 in jaw carriers 30. The body of the jaw carrier has a forward portion 32 provided with scroll teeth 34 on the face of the same and a back portion 36 in which the jaw retaining assembly is located. An opening 38 is provided through the hollow spindle 10 and an opening 40 is provided in the ring portion 16 to permit the jaw carrier to move in and out towards and away from a work piece in the slots 20 of the chuck body 12.

A scroll member 42 has a bore 44 for mounting on the ring member 16, the scroll member 42 having scroll threads 46 on the back face of the same adapted to mesh with the scroll threads 34 on the forward face of the jaw carrier 30, so that rotation of the scroll 42 will move the jaw carriers inwardly or outwardly in the radial slots 20 in the usual manner. The scroll disc 42 may also be provided on its outer periphery with one or more upstanding dogs or lug members 48 for a purpose which will be hereinafter more fully described.

A hand wheel 50 may be provided for the scroll chuck and will include a ring portion 52 having an internal bore 54 to engage over the peripheral edge 56 of the chuck body 12, the forward edge of the chuck body engaging a shoulder 60 and being confined within the hand wheel by means of a spring retainer ring 62 mounted in a peripheral slot 64 adjacent the edge of the hand wheel 50. The forward edge 66 of the hand wheel may have a circular opening 68 of a size slightly larger than the scroll disc and radially extending dogs 48, the opening 68 also having inwardly turned dogs 70, the dogs 70 extending to a point adjacent the peripheral edge 43 of the scroll disc 42.

A spring retainer ring 72 mounted in a peripheral groove 74 in the ring portion 16 of the chuck body prevents normal removal of the scroll disc 42, and a flat circular shield member 76 fastened by a plurality of screws 78 to the hand wheel 50 normally covers the area of the meeting edges of the scroll disc and handle, so that no extraneous matter may enter this area and the operator will not carelessly injure his fingers by reason of having them in the vicinity of the dogs 48 and the hammer lugs 70.

The jaw carriers 30, which are mounted for lateral movement in the slots 20 of the chuck body, may each have a removable jaw or jaw insert 80 generally cylindrical in shape, each jaw having a plurality of work gripping ridges 82 extending the length thereof. Each of the jaws 80 also has a centrally disposed boss 84 extending from the end of the same, the boss 84 adapted to be mounted through a bore 86 in a downwardly extending end wall 88 of the jaw carrier 30.

The jaw 80 is mounted by insertion from the left end into a generally circular bore 90 in the lower end of the jaw carrier 30, the bore being through an area of more than 180° at the lower end of the jaw carrier and terminating in an opening through which a portion of the jaw extends, the jaw being held from dropping out of the opening by the edge wall portions 92 and 94. Limited radial movement of the jaw 80 in the opening 90 is permitted by means of a spring-pressed ball 96 mounted in a semi-cylindrical cavity 97 in the top face of the jaw 80, the ball 96 being normally held by a compression spring 98 mounted in a bore 100 in the jaw carrier 30, I also provide a pin 102 in the bore 100 and a smaller concentric bore 104, the pin member normally resting against the ball 96, but capable of outward movement when the jaw 80 is rotated, its outward movement being limited by a set screw 106 mounted in a suitable tap in the bore 104.

Thus the pin 102 serves to limit the radial turning of the jaw 80 in the bore 90, but the set screw 106 is so arranged that complete rotation of the jaw 80 in the bore is not possible. Thus the spring means which I have provided normally act on the jaws to bias the same to a radial position, permitting turning of the jaws when a work piece is being gripped and when work is being done on the same.

In order to remove one of the jaws from the jaw carrier, it is necessary to engage the set screw 106 and withdraw the same in the bore 104 so that the pin member 102 will permit the ball 96 to leave the socket 97 completely, at which time the jaw may be pulled forward, removing the boss 84 from the opening 86 in the wall 88. In order to gain access to the set screws 106, I have provided suitable radial openings 110 through the hand wheel 50. The hand wheel 50 is preferably covered with a rubber liner R throughout its periphery, the liner R also having aligned ridges R¹ thereon at spaced intervals so that the same is easily and effectively grasped for turning.

With the construction of jaw and jaw carrier described, it can be seen that I have provided a comparatively long work holding jaw which is capable of receiving a balanced load throughout its length, the pressure for holding the jaws against the work effected thereon through the chuck body being generally medial between the ends of the same. This permits the chuck jaw to apply its gripping action over its full length.

With the assembly shown, face plates or other devices are not necessary for the mounting of the jaws in the jaw carrier, and when a jaw has become worn or needs replacement, it is a simple matter to remove and replace the same as described herein. In addition, the simple construction of the scroll chuck permits the easy assembly and operation of the same, the scroll disc and hand wheel having the hammer lugs and dogs so arranged that by centrifugal action a fastening or loosening action on the jaws may be easily obtained by operation of the hand wheel.

While I have illustrated and described a specific embodiment of the invention, it will be apparent to those skilled in the art that changes and modifications may be made in the exact details shown and I do not wish to be limited in any particular; rather what I desire to secure and protect by Letters Patent of the United States is:

1. A chuck of the type having a jaw carrier, radially reciprocal by virtue of engagement of teeth on the carrier with a manually operable scroll, an open-ended partially cylindrical socket in said carrier, a wall at one end of said socket, a jaw having a cylindrical bearing portion seated in said socket, a gripping portion adapted to engage a work piece and an axial boss at one end of the same, said boss engaging an opening in said wall to support said jaw and spring means engaging said jaw to bias the same to a radial position.

2. A chuck of the type having a jaw carrier, radially reciprocal by virtue of engagement of teeth on the carrier with a manually operable scroll, an open-ended partially cylindrical socket in said carrier, a wall at one end of said socket, a jaw having a cylindrical bearing portion seated in said socket, a gripping portion adapted to engage a work piece and an axial boss at one end of the same, said boss engaging an opening in said wall to support said jaw and spring means engaging said jaw to bias the same to a radial position, said jaw carrier supported in said chuck medially between the ends of said jaw.

3. A chuck of the type having a jaw carrier, radially reciprocal by virtue of engagement of teeth on the carrier with a manually operable scroll, an open-ended partially cylindrical socket in said carrier, a wall at one end of said socket, a jaw having a cylindrical bearing portion seated in said socket, a gripping portion adapted to engage a work piece and an axial boss at one end of the same, said boss engaging an opening in said wall to support said jaw and spring means engaging said jaw to bias the same to a radial position, said spring means including a socket in the top of the cylindrical bearing portion of said jaw, a bore in said jaw carrier aligned with said socket, a ball bearing therein, a coiled spring above said ball bearing and an elongated pin in said bore controlling the biasing of said jaw.

4. A chuck of the type having a jaw carrier, radially reciprocal by virtue of engagement of teeth on the carrier with a manually operable scroll, an open-ended partially cylindrical socket in said carrier, a wall at one end of said socket, a jaw having a cylindrical bearing portion seated in said socket, a gripping portion adapted to engage a work piece and an axial boss at one end of the same, said boss engaging said opening in said wall to support said jaw and spring means engaging said jaw to bias the same to a radial position, said spring means including a socket in the top of the cylindrical bearing portion of said jaw, a bore in said jaw carrier aligned with said socket, a ball bearing therein, a coiled spring above said ball bearing, an elongated pin in said bore controlling the biasing of said jaw, and an adjustable set screw cooperating with said pin.

5. In a chuck, a carrier adapted for radial reciprocal movement toward and away from a work piece, a partially cylindrical socket in said carrier parallel to the work piece axis, said socket having one open end and one closed end, an axial opening in said closed end, a bearing seated in said socket, said bearing having a boss engaging said opening, a jaw carried by said bearing and projecting radially towards said work axis, and spring means acting on said bearing to bias the jaw to a radial position.

6. In a chuck, a carrier adapted for radial reciprocal movement toward and away from a work piece, a partially cylindrical socket in said carrier parallel to the work piece axis, said socket having one open end and one closed end, an axial opening in said closed end, a bearing seated in said socket, said bearing having a boss engaging said opening, a jaw carried by said bearing and projecting radially towards said work axis, and spring means acting on said bearing to bias the jaw to a radial position, said spring means including a socket in the top of said bearing, a bore in said carrier in alignment with said socket, a ball in said socket, a coiled spring in said bore bearing against said ball, and an adjustable pin in said spring behind said ball.

7. A chucking device comprising a substantially cylindrical jaw, a holder therefor having a recess in which said jaw is mounted and enclosing more than half of the surface of said jaw, means in said jaw permitting slight rotation of said jaw in said holder in the direction of the gripping action thereof, said holder being provided with means for limiting the rotation of said jaw, said means including a spring pressed ball and a pin backing up said ball and having limited longitudinal movement.

8. A chucking device comprising a substantially cylindrical jaw, said jaw having an axial stud at one end therefor, a holder for said jaw having a recess in which said jaw is mounted and enclosing more than half of the surface of said jaw, said holder having an end wall, an opening therein to receive said stud, means in said jaw permitting slight rotation of said jaw in said holder in the direction of the gripping action thereof, said holder being provided with means for limiting the rotation of said jaw.

9. A chucking device comprising a substantially cylindrical jaw, said jaw having an axial stud at one end therefor, a holder for said jaw having a recess in which said jaw is mounted and enclosing more than half of the surface of said jaw, said holder having an end wall, an opening therein to receive said stud, means in said jaw permitting slight rotation of said jaw in said holder in the direction of the gripping action thereof, said holder being provided with means for limiting the rotation of said jaw, said means including a spring pressed ball and a pin backing up said ball and having limited longitudinal movement.

10. In a chuck, a carrier adapted for radial reciprocal movement toward and away from a work piece, an open-ended partially cylindrical socket in said carrier parallel to the work piece axis, a bearing seated in said socket, a jaw carried by said bearing and projecting radially towards said work axis, spring means acting on said bearing to bias the jaw to a radial position, and means associated with said spring means for limiting longitudinal radial movement of said bearing in said socket.

11. In a chuck, a carrier adapted for radial reciprocal movement toward and away from a work piece, an open-ended partially cylindrical socket in said carrier parallel to the work piece axis, a bearing seated in said socket, a jaw carried by said bearing and projecting radially towards said work axis, spring means acting on said bearing to bias the jaw to a radial position, and means associated with said spring means for limiting longitudinal radial movement of said bearings in said socket, said means including a pin member adjustably mounted in said carrier.

12. In a chuck, a carrier adapted for radial reciprocal movement toward and away from a work piece, an open-ended partially cylindrical socket in said carrier parallel to the work piece axis, a bearing seated in said socket, a jaw carried by said bearing and projecting radially towards said work axis, spring means acting on said bearing to bias the jaw to a radial position and a laterally movable pin member associated with said spring means for limiting radial and longitudinal movement of said bearing in said socket.

References Cited in the file of this patent

UNITED STATES PATENTS

| | | |
|---|---|---|
| 1,020,492 | Griggs | Mar. 19, 1912 |
| 1,844,616 | Whiton | Feb. 9, 1932 |
| 1,918,439 | Warman | July 18, 1933 |
| 2,429,524 | Oetzel | Oct. 21, 1947 |
| 2,523,374 | Jensen | Sept. 26, 1950 |
| 2,598,165 | Harvey | May 27, 1952 |
| 2,778,652 | Ingwer et al. | Jan. 22, 1957 |
| 2,811,366 | Chasar | Oct. 29, 1957 |